US009959766B2

(12) United States Patent
Ichihara et al.

(10) Patent No.: US 9,959,766 B2
(45) Date of Patent: May 1, 2018

(54) INFORMATION-COLLECTING DEVICE, INFORMATION-COLLECTION METHOD, AND PROGRAM-RECORDING MEDIUM

(71) Applicant: NEC Corporation, Tokyo (JP)

(72) Inventors: Etsuko Ichihara, Tokyo (JP); Kenichiro Fujiyama, Tokyo (JP); Koji Kida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 15/129,554

(22) PCT Filed: Mar. 18, 2015

(86) PCT No.: PCT/JP2015/001520
§ 371 (c)(1),
(2) Date: Sep. 27, 2016

(87) PCT Pub. No.: WO2015/146083
PCT Pub. Date: Oct. 1, 2015

(65) Prior Publication Data
US 2017/0116861 A1   Apr. 27, 2017

(30) Foreign Application Priority Data
Mar. 28, 2014   (JP) .................................. 2014-067356

(51) Int. Cl.
*G08G 1/16* (2006.01)
*H04W 4/04* (2009.01)
(Continued)

(52) U.S. Cl.
CPC ........... *G08G 1/166* (2013.01); *G08G 1/0112* (2013.01); *G08G 1/096775* (2013.01); *G08G 1/164* (2013.01); *H04W 4/046* (2013.01)

(58) Field of Classification Search
CPC ................ G08G 1/166; G08G 1/0112; G08G 1/096775; G08G 1/164; H04W 4/046
(Continued)

(56) References Cited

U.S. PATENT DOCUMENTS 5,109,224 A    4/1992 Lundberg
2003/0060936 A1*   3/2003 Yamamura ............. G08G 1/167
                                                              701/1
(Continued)

FOREIGN PATENT DOCUMENTS

JP     H03-505939 A    12/1991
JP     2005-004505 A    1/2005
(Continued)

OTHER PUBLICATIONS

International Search Report issued by the Japan Patent Office as International Searching Authority for International Application No. PCT/JP2015/001520 dated Jun. 23, 2015 (5 pages).

*Primary Examiner* — Kerri McNally
*Assistant Examiner* — Thang Tran
(74) *Attorney, Agent, or Firm* — Wilmer Cutler Pickering Hale and Dorr LLP

(57) ABSTRACT

Information regarding moving bodies (00) that are in danger of colliding is collected at an appropriate frequency in accordance with the degree of danger. This information-collecting device has a risk calculation unit and a transmission-interval determination unit. The risk calculation unit receives, from a plurality of moving bodies, state information that includes locations and velocities and is transmitted at provided time intervals. The risk calculation unit also computes the distance between and relative velocities of two moving bodies. The transmission-interval determination unit computes an interval such that the higher the relative velocities of two moving bodies are relative to the distance
(Continued)

therebetween, the shorter the interval is, and provides the computed interval to the moving bodies.

8 Claims, 5 Drawing Sheets

(51) Int. Cl.
  *G08G 1/01* (2006.01)
  *G08G 1/0967* (2006.01)
(58) Field of Classification Search
  USPC .......................................... 340/903
  See application file for complete search history.

(56) References Cited

U.S. PATENT DOCUMENTS

| | | | | |
|---|---|---|---|---|
| 2004/0249549 | A1* | 12/2004 | Kondoh | B60T 7/22 701/96 |
| 2007/0005609 | A1* | 1/2007 | Breed | B60N 2/2863 |
| 2007/0198136 | A1* | 8/2007 | Kobayashi | B60K 26/021 701/1 |
| 2012/0112895 | A1* | 5/2012 | Jun | G01S 5/0247 340/435 |
| 2012/0307059 | A1* | 12/2012 | Yamakage | B60W 40/09 348/148 |
| 2012/0323479 | A1* | 12/2012 | Nagata | B60Q 9/008 701/301 |
| 2013/0030681 | A1* | 1/2013 | Basnayake | G08G 1/0112 701/119 |
| 2013/0060548 | A1* | 3/2013 | Shimizu | G01S 17/023 703/8 |
| 2013/0107054 | A1* | 5/2013 | Ueoka | G01C 21/3697 348/148 |
| 2013/0141576 | A1* | 6/2013 | Lord | G08G 1/04 348/148 |
| 2013/0151088 | A1* | 6/2013 | Ricci | G06F 17/00 701/51 |
| 2013/0176856 | A1* | 7/2013 | Wang | H04W 74/0808 370/241 |
| 2013/0214940 | A1* | 8/2013 | Sako | G01C 21/34 340/905 |
| 2013/0226441 | A1* | 8/2013 | Horita | B60Q 9/00 701/118 |
| 2013/0279491 | A1* | 10/2013 | Rubin | G08G 1/166 370/347 |
| 2013/0282271 | A1* | 10/2013 | Rubin | G08G 9/02 701/423 |
| 2014/0272811 | A1* | 9/2014 | Palan | G07C 5/008 434/66 |
| 2014/0358840 | A1* | 12/2014 | Tadic | B60W 40/09 706/52 |
| 2016/0232791 | A1* | 8/2016 | Tosa | B60W 30/14 |

FOREIGN PATENT DOCUMENTS

| | | |
|---|---|---|
| JP | 2005-072854 A | 3/2005 |
| JP | 2009-003822 A | 1/2009 |
| JP | 2009-211397 A | 9/2009 |
| JP | 2010-102455 A | 5/2010 |
| JP | 2010-183178 A | 8/2010 |
| JP | 2011-035721 A | 2/2011 |
| WO | WO-90/12382 A1 | 10/1990 |

* cited by examiner

Fig.2

20 SENSOR DATA

| MOVING BODY ID | BASE STATION ID | TIME | POSITION | SPEED |
|---|---|---|---|---|
| 001 | A | 2013-05-30 12:00:05 | (135,0000、35,0000) | 60 |

21, 22, 23, 24, 25

INFORMATION-COLLECTING DEVICE, INFORMATION-COLLECTION METHOD, AND PROGRAM-RECORDING MEDIUM

CROSS REFERENCE TO RELATED APPLICATIONS

This application is a national stage application of International Application No. PCT/JP2015/001520 entitled "INFORMATION-COLLECTING DEVICE, INFORMATION-COLLECTION METHOD, AND PROGRAM-RECORDING MEDIUM", filed on Mar. 18, 2015, which claims the benefit of the priority Japanese Patent Application No. 2014-067356 filed on Mar. 28, 2014, the disclosures of each of which are hereby incorporated by reference in their entirety.

TECHNICAL FIELD

The present invention relates to an information-collecting device, an information-collecting method, and a program-recording medium, in particular, an information-collecting device, an information-collecting method, and a program-recording medium that collect information of a moving body such as a vehicle, a ship, or an airplane.

BACKGROUND ART

There is a system in which "information" created from a number of vehicles is collected via a "network" to be utilized. A sudden braking notification system is an example of such a system. The sudden braking notification is a service of notifying a plurality of vehicles existing behind a vehicle that brakes hard suddenly of occurrence of sudden braking.

The sudden braking notification system frequently collects information of a speed and a position of a vehicle so as to detect sudden braking in real time and accurately grasp an anteroposterior relationship of vehicles. In addition, there is a system in which information is collected from a number of airplanes or ships so as to achieve safe traffic. If these systems constantly collect a large amount of information, a large load is applied to the network. As a technology to control the load, the following technologies are disclosed.

PTL 1 discloses a vehicle that regularly transmits data to surrounding other vehicles while changing transmission power, that is, a communication distance. Accordingly, the vehicle transmits data to a nearby vehicle frequently and to a distant vehicle less frequently.

PTL 2 discloses a vehicle that transmits driving information of the own vehicle to vehicles that drive in the surrounding area. The vehicle determines a transmission frequency depending on a driving place of the own vehicle.

PTL 3 discloses a system in which a usage communication fee is calculated and a transmission interval is changed depending on a determination result whether or not to exceed a threshold value of the communication fee specified in advance.

CITATION LIST

Patent Literature

[PTL 1] JP 2010-183178 A
[PTL 2] JP 2009-3822 A
[PTL 3] JP 2005-72854 A

SUMMARY OF INVENTION

Technical Problem

The vehicle of PTL 1 controls a transmission frequency of data depending on a distance from another vehicle. The vehicle of PTL 2 controls a transmission frequency of data depending on a position of the vehicle. The system of PTL 3 controls a communication frequency depending on the communication fee. These technologies cannot control a communication frequency appropriately depending on a risk of a collision of a moving body, such as a vehicle, a ship, or an airplane. For example, the vehicle of PTL 1 cannot control a communication frequency appropriately with respect to two vehicles moving close to each other and two vehicles moving away from each other. The two vehicles moving close to each other are at high risk of a collision, however, the two vehicles moving away from each other are not at high risk of a collision.

An object of the present invention is to solve the above-described problem and provide an information-collecting device, an information-collecting method, and a program that collect information at an appropriate frequency.

Solution to Problem

An information-collecting device according to one aspect of the present invention includes: a risk calculation unit that receives state information including a position and a speed from a plurality of moving bodies that transmit the state information at a notified time interval, and calculates a distance and a relative speed between two moving bodies; and a transmission-interval determination unit that calculates an interval that is shortened depending on the relative speed with respect to the distance, and notifies the calculated interval to the two moving bodies.

An information-collecting method according to another aspect of the present invention includes: receiving state information including a position and a speed from a plurality of moving bodies that transmit the state information at a notified time interval, and calculating a distance and a relative speed between two moving bodies; and calculating an interval that is shortened depending on the relative speed with respect to the distance, and notifying the calculated interval to the two moving bodies.

Advantageous Effects of Invention

An information-collecting device according to the present invention can collect information of a moving body at an appropriate frequency.

BRIEF DESCRIPTION OF DRAWINGS

FIG. 2 illustrates a configuration of sensor data that a risk calculation unit 11 receives as input from a communication unit.

DESCRIPTION OF EMBODIMENTS

First Exemplary Embodiment (Description of Configuration)

Exemplary embodiments will be described in detail with reference to the drawings.

Figure 1:
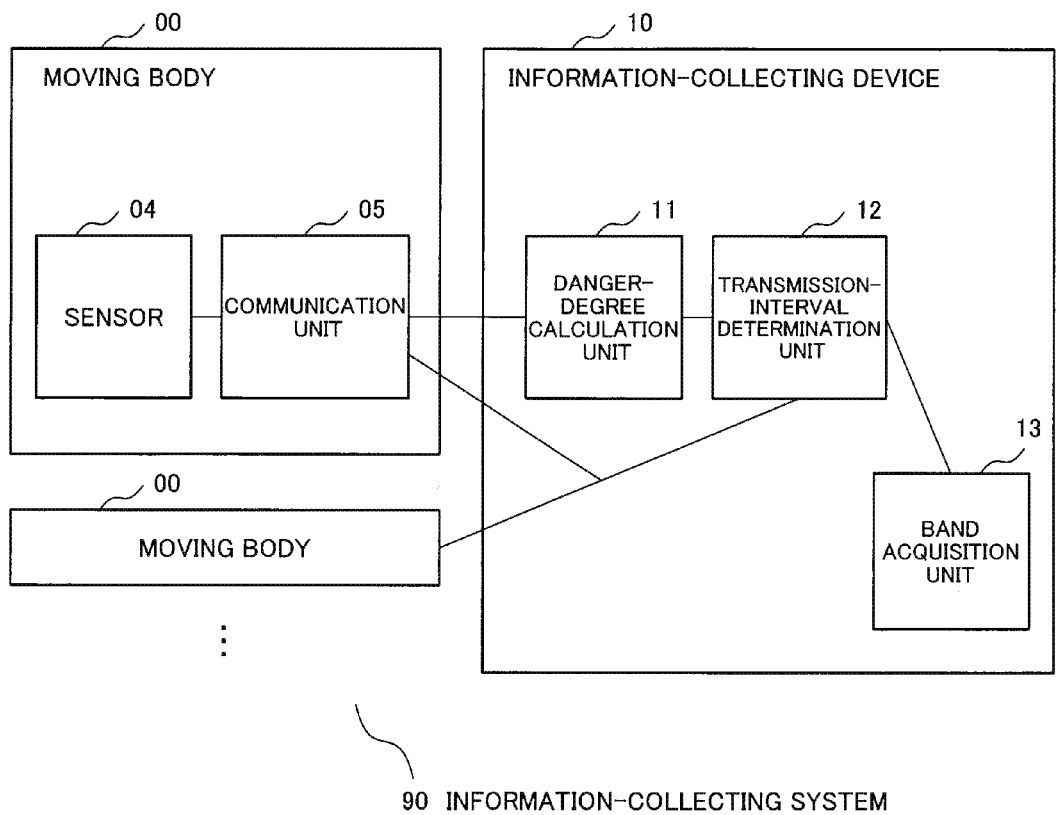
FIG. 1 illustrates a configuration of an information-collecting system according to a first exemplary embodiment of the present invention.

FIG. 1 illustrates a configuration of an information-collecting system 90 according to a first exemplary embodiment of the present invention. Referring to FIG. 1, the information-collecting system 90 includes a plurality of moving bodies 00 and at least one information-collecting device 10 connected to them by a wireless communication network. The moving bodies 00 are, for example, vehicles including automobiles and trains, airplanes, or ships.

The information-collecting device 10 includes a risk calculation unit 11, a transmission-interval determination unit 12, and a band acquisition unit 13. The information-collecting device 10 is a device that performs processing, such as sudden braking notification, using data transmitted from the moving body 00. Thus, the information-collecting device 10 includes a part that performs the processing. However, the part is omitted in the present drawing.

The moving body 00 includes a sensor 04 and a communication unit 05.

The risk calculation unit 11 of the information-collecting device 10 receives state information of the plurality of moving bodies 00, which varies from hour to hour, as input from the communication unit 05 of the moving body 00. For example, the risk calculation unit 11 stores the input as a history in a memory (not illustrated) of the information-collecting device 10. Furthermore, the risk calculation unit 11 calculates a risk 44 from the input and the history, and outputs a state of the moving body 00 including the risk 44 to the transmission-interval determination unit 12. The risk 44 is, for example, an index indicating a collision possibility between the moving body 00 and another moving body 00. For example, the risk 44 becomes larger as the collision possibility is increased. However, this is merely an example, and an expression of the risk 44 is not limited thereto.

FIG. 2 illustrates a configuration of sensor data 20 that is the state information that the risk calculation unit 11 receives as the input from the communication unit 05. The sensor data 20 includes a moving body ID (IDentification) 21, a base station ID 22, a time 23, a position 24, and a speed 25.

The moving body ID 21 represents an ID that identifies the moving body 00. The base station ID 22 represents an ID of a base station that the moving body 00 uses for communication. The time 23 represents a time when the sensor 04 records the position 24 and the speed 25. The position 24 represents a position of the moving body 00, for example, longitude and latitude. When the moving body 00 is an airplane, the position 24 may include an altitude. The speed 25 represents a moving speed of the moving body 00.

The sensor data 20 includes a data item for performing the processing, such as sudden braking notification, but the data item is omitted in the present drawing.

For example, when "a vehicle having an ID of 001 communicates with a base station A, and runs at a speed of 60 km/h at a position of longitude 135.0000 and latitude 35.0000 at a time of 2013-05-30 12:00:05", the sensor data 20 becomes the data illustrated in FIG. 2. More specifically, the sensor data 20 becomes the data "001", "A", "2013-05-30 12:00:05", "(135.0000, 35.0000)", "60", which is obtained by sequentially connecting values of "the moving body ID 21", "the base station ID 22", "the time 23", "the position 24", and "the speed 25".

Figure 3:
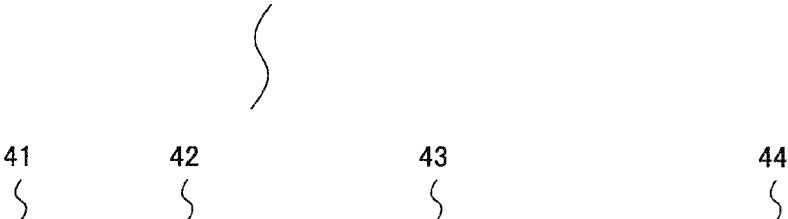
FIG. 3 illustrates a configuration of transmission-interval calculation data that the risk calculation unit outputs to a transmission-interval determination unit.

FIG. 3 illustrates a configuration of transmission-interval calculation data 40 that the risk calculation unit 11 outputs to the transmission-interval determination unit 12. The transmission-interval calculation data 40 includes a moving body ID 41, a base station ID 42, a time 43, and the risk 44. FIG. 3 exemplifies two pieces of the transmission-interval calculation data 40 created with respect to the moving bodies 00 whose moving body IDs 41 are 001 and 002.

A calculation method of the risk 44, which the risk calculation unit 11 performs will be described. The risk calculation unit 11 calculates a distance and a relative speed between two moving bodies 00 from two pieces of the sensor data 20 received from the two moving bodies 00, and calculates the risk 44 from the distance between vehicles and the relative speed.

When receiving new sensor data 20 from a certain moving body 00, for example, a moving body A, the risk calculation unit 11 extracts a moving body 00 that travels in the same direction along the same route as the moving body A. The risk calculation unit 11 performs the extraction from a trajectory of the moving body 00 and stored positional information of the route, for example. The risk calculation unit 11 determines the trajectory of the moving body 00 from the time 23 and the position 24 of the sensor data 20 in the history, for example. Here, the route is, for example, a road, a railroad, a sea route, or an air route.

When the route and the traveling direction can be determined from only the position 24, the positional information of the route is unnecessary. For example, there is a case where an identifier and section numbers that continuously increase or decrease from a starting point to an ending point are assigned to each route, and transmitters each of which transmits the identifier of the route and the section number are placed along the route at regular intervals. In such a situation, when a combination of the identifier of the route and the section number that the moving body 00 has received is the position 24, road information is unnecessary for the determination. More specifically, the risk calculation unit 11 can determine the route from the route identifier included in the position 24, and the traveling direction in which the moving body moves from a temporal change of the section number.

It is to be noted that, as a given condition, when it is known that the moving body 00 to be targeted travels in the same direction along the same road or railroad, the extraction itself is unnecessary.

Next, the risk calculation unit 11 narrows down the sensor data 20 that another moving body 00 that is in the vicinity of the moving body A and is coming close to the moving body A has transmitted, from the extracted history. A narrowing-down condition is, for example, the latest data of a moving body 00 in which differences in the time 23 and the position 24 are within certain ranges, the moving body ID 21 is different, and a distance from the moving body A is reduced. The risk calculation unit 11 determines from the position 24 and the speed 25 whether the distance from the moving body A is reduced. More specifically, the risk calculation unit 11 determines whether the distance from the moving body A is reduced depending on whether the speed 25 of a moving body 00 behind in the traveling direction is faster than that of a moving body 00 in front.

It is to be noted that, when a plurality of pieces of the sensor data 20 are extracted from the history after performing the narrowing-down, the risk calculation unit 11 may select one piece of the sensor data 20. For example, the risk calculation unit 11 selects the sensor data 20 of the moving body 00 that is the closest to the moving body A.

The risk calculation unit 11 calculates a distance between the two moving bodies 00 from a difference in the position 24 between two pieces of the sensor data 20, the sensor data 20 of the moving body A and the narrowed-down sensor data 20. In addition, the risk calculation unit 11 calculates a difference in the speed 25 between the two pieces of the sensor data 20 as a relative speed. Furthermore, the risk calculation unit 11 calculates the risk 44 by dividing the calculated relative speed by the distance between vehicles and determining an absolute value, and outputs the risk 44 to the transmission-interval determination unit 12 as the transmission-interval calculation data 40. However, the calculation method is merely an example, and the calculation method of the risk 44 is not limited thereto.

The risk calculation unit 11 creates one piece of the transmission-interval calculation data 40 with respect to the sensor data 20 of the moving body A, and creates another piece of the transmission-interval calculation data 40 with respect to the sensor data 20 extracted from the history. The moving body ID 41, the base station ID 42, and the time 43 of the transmission-interval calculation data 40 are copied from the moving body ID 21, the base station ID 22, and the time 23 of each sensor data 20.

When there are a plurality of (m) pieces of the sensor data 20 extracted from the history, the risk calculation unit 11 may calculate the risk 44 between the sensor data 20 of the moving body A and each of the extracted m pieces of the sensor data 20. After that, the risk calculation unit 11 creates one piece of the transmission-interval calculation data 40 with respect to the sensor data 20 of the moving body A, and creates one piece of the transmission-interval calculation data 40 with respect to each of the m pieces of the sensor data 20 extracted from the history. In this case, the risk calculation unit 11 sets, for example, the maximum value among the m risks 44 in the transmission-interval calculation data 40 created with respect to the sensor data 20 of the moving body A.

A concrete description will be given using a numerical example. When the inputted sensor data 20 is the one exemplified in FIG. 2, the risk calculation unit 11 searches from the history the latest sensor data 20 of a moving body 00 within a distance of 100 m depending on the position 24 (135.0000, 35.0000) to extract the position 24 and the speed 25. The risk calculation unit 11 extracts from the history, for example, the sensor data 20 in which the moving body ID 21 is 002, the position 24 is (135.0000, 35.0002), and the speed 25 is 55 km/h, and performs calculation, so that the distance between vehicles is about 22 m and the relative speed is 60−55=5 (km/h). Furthermore, the risk calculation unit 11 divides the calculated relative speed by the distance between vehicles to obtain 5/22≈0.23, and this is assumed as the risks 44 of the moving bodies 001, 002. FIG. 3 exemplifies the two pieces of the transmission-interval calculation data 40 created here.

The band acquisition unit 13 outputs a usage state of a communication band that the moving body 00 uses to the transmission-interval determination unit 12. In concrete terms, the band acquisition unit 13 obtains the base station ID from the transmission-interval determination unit 12, and outputs an available band (bps: bits per second) of the base station.

The base station is an existing device. The band acquisition unit 13 stores a log regarding data indicating a maximum communication band of the base station and current communication, and calculates and stores in the memory (not illustrated) of the information-collecting device 10 the current available band of each base station. The band acquisition unit 13 may store the maximum communication band of the base station.

Figure 4:
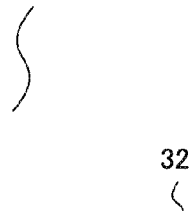
FIG. 4 illustrates a configuration of band data that a band acquisition unit stores.

FIG. 4 illustrates a configuration of band data 30 that the band acquisition unit 13 stores. The band data 30 includes a base station ID 31 and a current available band 32. The band acquisition unit 13 filters the band data 30 by the base station ID received as the input, and outputs the available band 32 regarding the base station of the base station ID. The band acquisition unit 13 may acquire the available band of the base station from the base station or a management server device of a carrier, for example.

For example, as illustrated in the example of FIG. 4, "when an available band of a base station having an ID of A is 128 bps", the band acquisition unit 13 may perform output in the form of "the base station ID 31" and "the available band 32". In this example, the output is a value of "A" and "128".

The transmission-interval determination unit 12 receives the transmission-interval calculation data 40 as input from the risk calculation unit 11, and stores the transmission-interval calculation data 40 as a history in the memory (not illustrated) of the information-collecting device 10. Furthermore, the transmission-interval determination unit 12 calculates, from each transmission-interval calculation data 40, a transmission interval whose value becomes smaller as the risk 44 becomes higher, with respect to the moving body 00 of the moving body ID 41, and outputs the transmission interval to the moving body 00. It is to be noted that the transmission-interval determination unit 12 does not always have to take a history of the transmission-interval calculation data 40.

In addition, the transmission-interval determination unit 12 acquires base station information from the band acquisition unit 13 using the inputted base station ID 42. In concrete terms, the transmission-interval determination unit 12 outputs "the base station ID"="A" to the band acquisition unit 13, and receives the available band 32 as input.

When taking a history, the transmission-interval determination unit 12 searches the history by the inputted moving body ID 41, and the searched transmission-interval calculation data 40 is overwritten by the inputted transmission-interval calculation data 40. When the inputted moving body ID 41 does not exist in the history, the inputted transmission-interval calculation data 40 is added to the history as a new record.

A transmission interval calculation method that the transmission-interval determination unit 12 performs will be described. The transmission-interval determination unit 12 calculates from the available band 32 of the base station and the size of the sensor data 20, a minimum transmission interval within a range not exceeding the band. Furthermore, the transmission-interval determination unit 12 calculates a transmission interval according to the risk 44.

In concrete terms, the transmission-interval determination unit 12 divides the size of the sensor data 20 that the moving body 00 transmits by the current available band 32 obtained from the band acquisition unit 13, and this value is assumed as a minimum value of the transmission interval.

When the maximum available band 32 is obtained from the band acquisition unit 13, the transmission-interval determination unit 12 divides a product of the size of the sensor data 20 and the number of the moving bodies 00 that use the same base station by the value of the available band 32 obtained from the band acquisition unit 13, and this value is assumed as the minimum value of the transmission interval. The transmission-interval determination unit 12 obtains from the history within a past certain time of the sensor data 20 that the risk calculation unit 11 acquires, the number of the moving bodies 00 that use the same base station by counting the number of the moving body IDs 21, which is different in each base station ID 22. Alternatively, the transmission-interval determination unit 12 may obtain the number from a fixed value given as a parameter. This value is, for example, an estimate value based on past statistics.

In addition, the transmission-interval determination unit 12 calculates an inverse number of the risk 44 with respect to all pieces of the inputted transmission-interval calculation data 40, and the value is transmitted to the moving body 00 of each of the moving body IDs 41. However, when a standard value of the transmission interval is below the minimum value of the transmission interval, the transmission-interval determination unit 12 transmits the minimum value to the moving body 00. The calculation method is merely an example, and the transmission interval calculation method is not limited thereto.

For example, the transmission-interval determination unit 12 may calculate the transmission interval only from the risk without calculating the minimum value from the available band. In this case, the information-collecting device 10 does not have to include the band acquisition unit 13.

A concrete description will be given using a numerical example. When the inputted transmission-interval calculation data 40 shows the two pieces of data exemplified in FIG. 3, the transmission-interval determination unit 12 calculates an inverse number of the value of the risk 44, 0.23, 1/0.23≈4.3 (secs), and this is assumed as the standard value of the transmission interval. In addition, since the available band 32 of the base station A is 128 (bps) and the number of vehicles that use the base station A is two, if the size of the sensor data 20 that the moving body 00 transmits is 64 (bits), the transmission-interval determination unit 12 calculates 64 (bits)×2 (the number of the vehicles)/128 (bps)=1.0 (sec), and this is assumed as the minimum value of the transmission interval.

Here, the risk calculation unit 11, the transmission-interval determination unit 12, and the band acquisition unit 13 are configured by logic circuits. They are stored in the memory (not illustrated) of the information-collecting device 10 that is a computer, and may be achieved by software that is executed by a processor (not illustrated) of the information-collecting device 10.

The sensor 04 of the moving body 00 outputs state information of the moving body 00, which varies from hour to hour, to the communication unit 05. The sensor 04 is a combination of a plurality of existing devices. For example, a GPS sensor 04 for acquiring a position and a speed sensor 04 for acquiring a speed are mounted on the moving body 00, and each sensor 04 outputs each measurement value to the communication unit 05.

The communication unit 05 receives the state information of the moving body 00, which varies from hour to hour, as input from the sensor 04, stores the state of the moving body 00 as a history, detects a change in an operation of the moving body 00 from the state information of the moving body 00 and the history, and starts transmission of the sensor data 20. At this time, the communication unit 05 creates the sensor data 20 based on the latest measurement value of the sensor 04, and transmits the sensor data 20 to the risk calculation unit 11 of the information-collecting device 10 at a time interval stored in a memory (not illustrated) of the moving body 00. The communication unit 05 creates the sensor data 20 to be transmitted by setting the stored ID of the own moving body 00 in the moving body ID 21, an ID obtained from a base station with which the communication unit 05 currently communicates in the base station ID 22, the measurement values obtained from the sensor 04 in the position 24 and the speed 25.

In addition, when receiving the time interval from the transmission-interval determination unit 12 of the information-collecting device 10, the communication unit 05 replaces the value stored in the memory.

Here, the communication unit 05 is configured by logic circuits. That is stored in a memory of a computer (not illustrated) mounted on the moving body 00 that is a computer, and may be achieved by software that is executed by a processor thereof.

(Description of Operation)

Figure 5:
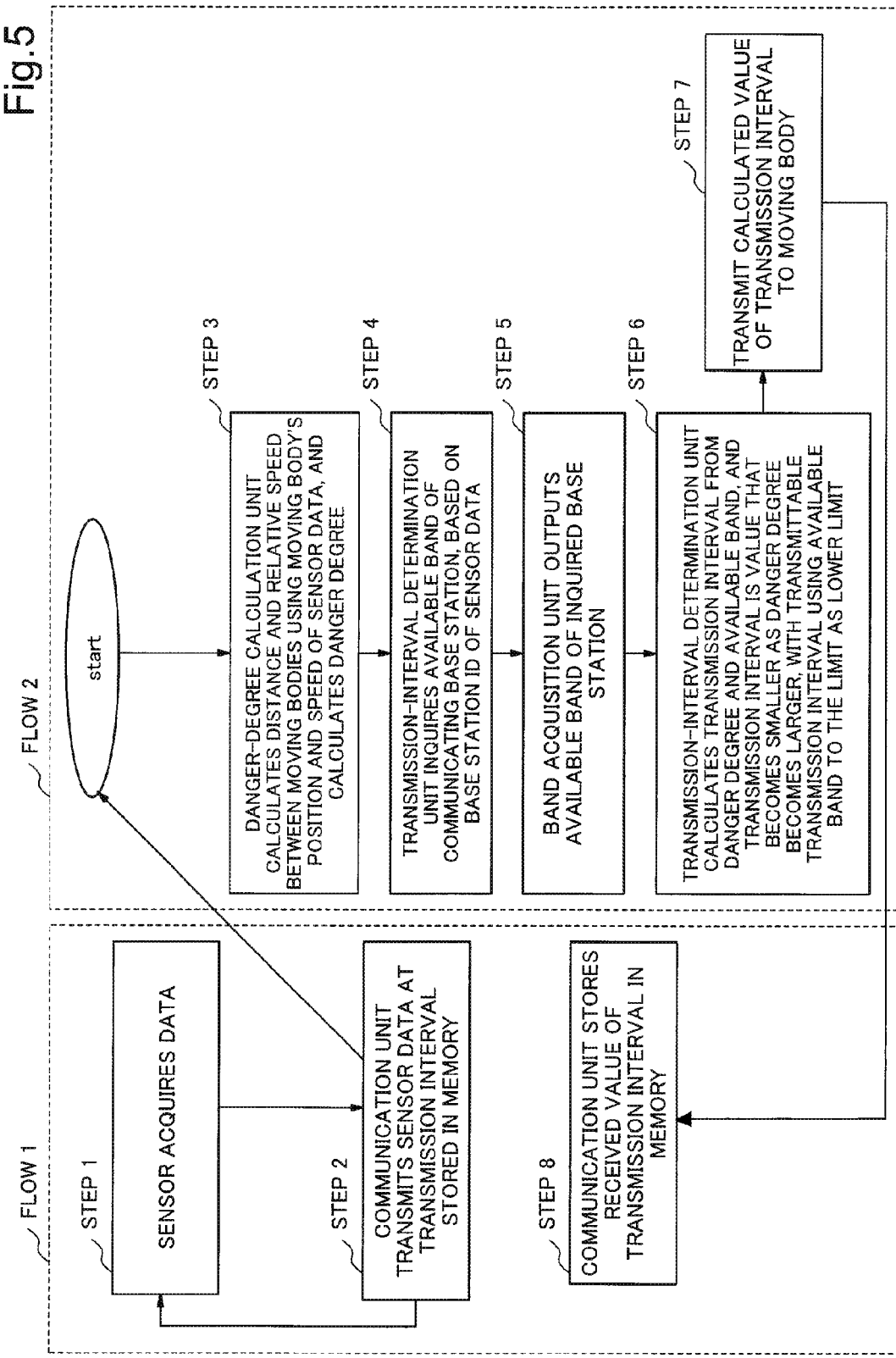
FIG. 5 is an operation flowchart of the information-collecting system.

FIG. 5 is an operation flowchart of the information-collecting system 90. The operation flow of the information-collecting system 90 includes a flow 1 in which the moving body 00 acquires vehicle information and transmits the vehicle information to the information-collecting device 10, and a flow 2 in which the information-collecting device 10 determines a transmission frequency from the vehicle information and the available band 32 of a network.

In the flow 1, a step 1 and a step 2 are repeatedly executed. The sensor 04 executes the step 1 of outputting a state of the moving body 00, which varies from hour to hour, to the communication unit 05. The communication unit 05 executes the step 2 of transmitting the state of the moving body 00, which varies from hour to hour, at a transmission interval stored in the memory.

In the flow 2, a step 3, a step 4, a step 5, a step 6 and a step 7 are sequentially executed. The flow 2 is started when the step 2 of the flow 1 is operated, and is finished when the execution of the step 7 is finished.

The risk calculation unit 11 executes the step 3 of calculating the risk 44 from the state of the moving body 00, which varies from hour to hour. The transmission-interval determination unit 12 executes the step 4 of inquiring the available band 32 of the base station from the base station ID 22 used for transmitting the state of the moving body 00. In this step, the transmission-interval determination unit 12 performs inquiry to the band acquisition unit 13. The band acquisition unit 13 executes the step 5 of outputting the available band 32 of the base station used for transmitting the state information of the moving body 00.

The transmission-interval determination unit 12 executes the step 6 of calculating the transmission interval of the moving body 00 from the risk 44 and the available band 32. Furthermore, the transmission-interval determination unit 12 also executes the step 7 of transmitting the value of the transmission interval to the communication unit 05 of the moving body 00.

It is to be noted that the communication unit 05 of the moving body 00 executes the step 8 of storing the transmission interval received from the transmission-interval determination unit 12 in the memory.

The information-collecting device 10 can collect information of the moving body 00 at risk for a collision at an appropriate frequency, depending on the risk 44 thereof. In addition, the information-collecting device 10 can determine the transmission interval that effectively uses a network band for each moving body 00, depending on a peripheral situation such as a usage situation of a network.

The first reason is that the risk calculation unit 11 calculates the risk 44 indicating the degree of the collision possibility from the sensor data 20 that two moving bodies 00 have transmitted, and the transmission-interval determination unit 12 calculates a short (long) data transmission interval depending on the highness (lowness) of the risk 44. More specifically, the information-collecting device 10 frequently collects data from a moving body 00 of high risk. Rapid control for avoiding danger becomes possible. On the other hand, the information-collecting device 10 collects data less frequently from a moving body 00 of low risk. An increase in a network load can be suppressed.

The second reason is that the transmission-interval determination unit 12 calculates a lower limit of the transmission interval due to the limitation of the available band 32 of a base station, and performs control such that the transmission interval of the moving body 00 is not below the lower limit.

Second Exemplary Embodiment

Figure 6:
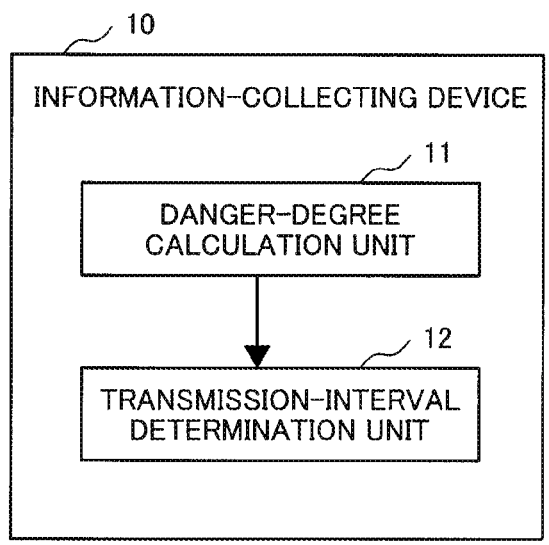
FIG. 6 is a configuration diagram of an information-collecting device according to a second exemplary embodiment.

FIG. 6 is a configuration diagram of the information-collecting device 10 according to a second exemplary embodiment.

The information-collecting device 10 includes the risk calculation unit 11 and the transmission-interval determination unit 12. The risk calculation unit 11 receives state information including a position and a speed from a plurality of moving bodies 00 that transmit the state information at a notified time interval, and calculates a distance and a relative speed between two moving bodies 00. The transmission-interval determination unit 12 calculates an interval that is shortened depending on the relative speed with respect to the distance, and notifies the calculated interval to the two moving bodies 00.

The information-collecting device 10 can collect information of the moving body 00 at risk for a collision at an appropriate frequency, depending on the risk 44 thereof. In addition, the information-collecting device 10 can determine the transmission interval that effectively uses a network band for each moving body 00, depending on a peripheral situation such as a usage situation of a network.

The reason is that the risk calculation unit 11 calculates the risk 44 indicating the degree of the collision possibility from the sensor data 20 that two moving bodies 00 have transmitted, and the transmission-interval determination unit 12 calculates a short (long) data transmission interval depending on the highness (lowness) of the risk 44. More specifically, the information-collecting device 10 frequently collects data from a moving body 00 of high risk. Rapid control for avoiding danger becomes possible. On the other hand, the information-collecting device 10 collects data less frequently from a moving body 00 of low risk. An increase in a network load can be suppressed.

Although the present invention has been described with reference to the exemplary embodiments, the present invention is not limited to the above-described exemplary embodiments. Various modifications that a person skilled in the art can understand can be made to configurations and details of the present invention within the scope of the present invention.

This application claims priority to Japanese Patent Application No. 2014-067356 filed on Mar. 28, 2014, the entire contents of which are incorporated herein.

REFERENCE SIGNS LIST

00 moving body
04 sensor
05 communication unit
10 information-collecting device
11 risk calculation unit
12 transmission-interval determination unit
13 band acquisition unit
20 sensor data
21 moving body ID
22 base station ID
23 time
24 position
25 speed
30 band data
31 base station ID
32 available band
40 transmission-interval calculation data
41 moving body ID
42 base station ID
43 time
44 risk
90 information-collecting system

The invention claimed is:

1. An information-collecting device comprising: memory storing program instructions; and at least one processor to execute the instructions to: receive state information including a position and a speed from a plurality of moving bodies that transmit the state information at a notified time interval, and calculate a distance and a relative speed between two moving bodies; calculate an interval that is shortened depending on the relative speed with respect to the distance; and for each respective moving body of the plurality of moving bodies: acquire an available communication band of a base station being used by the respective moving body, calculate a lower interval limit by dividing a product of a size of the state information and a number of moving bodies that are using the base station being used by the respective moving body by the available communication band of the base station being used by the respective moving body, and when the calculated interval is lower than the lower interval limit, send the lower interval limit to the respective moving body in place of the calculated interval.

2. The information-collecting device according to claim 1, wherein the at least one processor is to execute the instructions to determine a route and a traveling direction in which a moving body moves from a temporal change of the position included in the state information, extract two moving bodies that travel in the same direction in the same route, and calculate the distance and the relative speed between the extracted two moving bodies.

3. The information-collecting device according to claim 2, wherein an identifier and section numbers that continuously increase or decrease from a starting point to an ending point are assigned to the route, the position included in the state information includes a route identifier and a section number received from each of a plurality of position-displaying devices that are placed along the route at regular intervals and transmit the identifier of the route and the section numbers, and the at least one processor is to execute the instructions to determine the route from the route identifier included in the state information, and determine the traveling direction in which a moving body moves from a temporal change of the section number.

4. An information-collecting system comprising: the information-collecting device according to claim 1; and a moving body that receives from the information-collecting device and stores a time interval, and transmits the state information at the stored time interval.

5. An information-collecting method comprising: receiving state information including a position and a speed from a plurality of moving bodies that transmit the state information at a notified time interval, and calculating a distance and a relative speed between two moving bodies; calculating an interval that is shortened depending on the relative speed with respect to the distance; and for each respective moving body of the plurality of moving bodies: acquiring an available communication band of a base station being used by the respective moving body; calculating a lower interval limit by dividing a product of a size of the state information and a number of moving bodies that are using the base station being used by the respective moving body by the available communication band of the base station being used by the respective moving body, and when the calculated interval is lower than the lower interval limit, sending the lower interval limit to the respective moving body in place of the calculated interval.

6. The information-collecting method according to claim 5, comprising: determining a route and a traveling direction in which a moving body moves from a temporal change of the position included in the state information, extracting two moving bodies that travel in the same direction in the same route, and calculating the distance and the relative speed between the extracted two moving bodies.

7. The information-collecting method according to claim 6, wherein an identifier and section numbers that continuously increase or decrease from a starting point to an ending point are assigned to the route, the position included in the state information includes a route identifier and a section number received from each of a plurality of position-displaying devices that are placed along the route at regular intervals and transmit the identifier of the route and the section numbers, and the method further comprising determining the route from the route identifier included in the state information, and determining the traveling direction in which a moving body moves from a temporal change of the section number.

8. A non-transitory recording medium recording thereon a program that causes a computer to: receive state information including a position and a speed from a plurality of moving bodies that transmit the state information at a notified time interval, and calculate a distance and a relative speed between two moving bodies; calculate an interval that is shortened depending on the relative speed with respect to the distance; and for each respective moving body of the plurality of moving bodies: acquire an available communication band of a base station being used by the respective moving body, calculate a lower interval limit by dividing a product of a size of the state information and a number of moving bodies that are using the base station being used by the respective moving body by the available communication band of the base station being used by the respective moving body, and when the calculated interval is lower than the lower interval limit, send the lower interval limit to the respective moving body in place of the calculated interval.

* * * * *